United States Patent
Lee et al.

(10) Patent No.: US 10,071,623 B2
(45) Date of Patent: Sep. 11, 2018

(54) STRUCTURE OF POWER TRAIN FOR VEHICLE

(71) Applicants: HYUNDAI MOTOR COMPANY, Seoul (KR); KIA MOTORS CORPORATION, Seoul (KR)

(72) Inventors: Hee Ra Lee, Anyang-si (KR); Yeon Ho Kim, Suwon-si (KR); Kyung Seob Shin, Suwon-si (KR); Young Jin Seo, Yongin-si (KR); Myung Gyu Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/367,855

(22) Filed: Dec. 2, 2016

(65) Prior Publication Data
US 2018/0065466 A1    Mar. 8, 2018

(30) Foreign Application Priority Data

Sep. 8, 2016   (KR) .................. 10-2016-0115748

(51) Int. Cl.
*B60K 6/387*   (2007.10)
*B60K 6/30*    (2007.10)
(Continued)

(52) U.S. Cl.
CPC ............. *B60K 6/387* (2013.01); *B60K 6/30* (2013.01); *B60K 6/405* (2013.01); *B60K 6/48* (2013.01);
(Continued)

(58) Field of Classification Search
CPC .......... B60K 6/387; B60K 6/405; B60K 6/48; B60K 6/30; B60K 2006/4825;
(Continued)

(56) References Cited

U.S. PATENT DOCUMENTS

| 2009/0037060 A1* | 2/2009 | Carlhammar | B60K 6/387 |
| | | | 701/54 |
| 2013/0059695 A1* | 3/2013 | Kuwahara | B60K 6/387 |
| | | | 477/86 |

(Continued)

FOREIGN PATENT DOCUMENTS

| KR | 10-1998-0022515 A | 7/1998 |
| KR | 10-2006-0079683 A | 7/2006 |

(Continued)

OTHER PUBLICATIONS

Korean Office Action issued in Application No. 10-2016-0115748 dated May 11, 2017.

*Primary Examiner* — David J Hlavka
(74) *Attorney, Agent, or Firm* — McDermott Will & Emery LLP

(57) ABSTRACT

A structure of a powertrain for a vehicle according to the present invention includes: a first clutch connecting or disconnecting power from an engine; a driving motor disposed between the first clutch and a transmission, including a stator and a rotor, and having a recess, such that a center of a side of the rotor that faces the first clutch concaves toward the transmission; and an actuator at least partially inserted in the recess to operate the first clutch.

8 Claims, 5 Drawing Sheets

(51) Int. Cl.
*B60K 6/48* (2007.10)
*B60K 6/405* (2007.10)
*F16D 21/06* (2006.01)
*F16D 25/04* (2006.01)
*F16D 13/58* (2006.01)
*F16D 121/04* (2012.01)
*F16D 125/58* (2012.01)

(52) U.S. Cl.
CPC .............. *F16D 13/58* (2013.01); *F16D 21/06* (2013.01); *F16D 25/044* (2013.01); B60K 2006/4825 (2013.01); B60Y 2200/92 (2013.01); B60Y 2400/424 (2013.01); F16D 2021/0653 (2013.01); F16D 2021/0692 (2013.01); F16D 2121/04 (2013.01); F16D 2125/582 (2013.01); F16D 2300/26 (2013.01); Y10S 903/914 (2013.01)

(58) Field of Classification Search
CPC ........ F16D 13/58; F16D 25/044; F16D 21/06; F16D 2300/26; F16D 2121/04; F16D 2021/0653; F16D 2021/0692; F16D 2125/582

See application file for complete search history.

(56) References Cited

U.S. PATENT DOCUMENTS

| | | | |
|---|---|---|---|
| 2014/0034443 A1* | 2/2014 | Reitz | B60K 6/26 |
| | | | 192/30 V |
| 2017/0080793 A1* | 3/2017 | Suyama | F16H 57/042 |

FOREIGN PATENT DOCUMENTS

| | | |
|---|---|---|
| KR | 10-2006-0116170 A | 11/2006 |
| KR | 10-0765611 B1 | 10/2007 |
| KR | 10-2008-0033699 A | 4/2008 |
| KR | 10-2009-0053017 A | 5/2009 |
| KR | 10-2014-0073305 A | 6/2014 |
| KR | 10-2014-0105227 A | 9/2014 |
| KR | 10-2016-0104121 A | 9/2016 |

* cited by examiner

STRUCTURE OF POWER TRAIN FOR VEHICLE

CROSS REFERENCE TO RELATED APPLICATION

The present application claims the benefit of priority to Korean Patent Application No. 10-2016-0115748, filed Sep. 8, 2016, the entire content of which is incorporated herein for all purposes by this reference.

TECHNICAL FIELD

The present disclosure relates to a structure of powertrain for a vehicle, and more particularly, to a structure of a powertrain composed of a series of parts for transmitting power from an engine.

BACKGROUND

A vehicle is equipped with a power source for generating power such as an engine and is also equipped with a powertrain composed of a series of parts for transmitting power from the power source to wheels.

A powertrain may generally include a clutch and a transmission and is an important part in terms of the performance and design of a vehicle.

In particular, the shape of a powertrain or the space and position occupied by a powertrain has a large influence on the design of a vehicle as an important matter, in regard to designing a vehicle, to reduce the overall length of powertrain and develop an efficient structure.

The description provided above as a related art of the present disclosure is only for helping understanding the background of the present disclosure and should not be construed as being included in the related art known by those skilled in the art.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a structure of a powertrain for a vehicle, the structure effectively reducing the overall length of the powertrain and enabling stable and efficient operation of a powertrain in a vehicle equipped with an engine and a driving motor for supplying power.

According to one exemplary embodiment of the present disclosure, a structure of a powertrain for a vehicle, the structure includes: a first clutch connecting or disconnecting power from an engine; a driving motor disposed between the first clutch and a transmission, including a stator and a rotor, and having a recess such that a center of a side of the rotor that faces the first clutch concaves toward the transmission; and an actuator at least partially inserted in the recess to operate the first clutch.

The structure may further include a housing receiving the driving motor and the first clutch therein and having a separation wall separating the driving motor and the first clutch in a compartment structure.

The separation wall of the housing may be recessed at the center to be inserted in the recess of the rotor and the actuator may be disposed at the center of the separation wall.

The actuator may be a hydraulic actuator, may have a hydraulic chamber in which a hydraulic pressure is generated by an oil supplied therein, may have a pressing portion that is moved along a motor shaft of the driving motor by the hydraulic pressure generated in the hydraulic chamber to press a leaf spring of the first clutch, and may have a support spring supporting the pressing portion to keep the pressing portion in contact with the leaf spring.

The structure may further include: a second clutch disposed between the transmission and the driving motor to connect or disconnect power transmitted from the driving motor to the transmission; and a cover separating the second clutch and the driving motor, in which a compartment structure separating the first clutch, the driving motor, and the second clutch may be formed by the separation wall and the cover.

The center of the cover may be fitted on a motor shaft of the driving motor and a sealing member may be provided to fill the gap between the motor shaft and the cover.

The structure may further include a second clutch disposed between the transmission and the driving motor to connect or disconnect power transmitted from the driving motor to the transmission, in Which a hole may be formed in a motor shaft of the driving motor and a rotary shaft of the second clutch may be at least partially inserted in the motor shaft.

The structure may further include a housing receiving the driving motor and the first clutch therein and having a separation wall separating the driving motor and the first clutch in a compartment structure, in which a first bearing supporting the motor shaft may be disposed between the separation wall and the motor shaft and a second bearing supporting the rotary shaft may be disposed between the motor shaft and the rotary shaft of the second clutch.

A sensor ring may be mounted on a flywheel mounted on a crankshaft of the engine and a position sensor may be disposed in the radial direction of the flywheel to detect the rotational speed of the sensor ring.

The sensor ring may protrude in the longitudinal direction of the crankshaft from an outer side of the flywheel, and may have a plurality of holes formed at regular intervals.

According to the structure of a powertrain for a vehicle, it is possible to provide a powertrain structure for a vehicle of which the overall length is effectively reduced and that is stably and efficiently operated in a vehicle equipped with an engine and a driving motor for supplying power.

In particular, in the driving motor including a stator and a rotor, a recess is formed by making the center of a side that faces the first clutch concave, and the actuator for operating the first clutch is at least partially inserted in the recess, whereby it is possible to effectively reduce the length occupied by the actuator in the entire structure and to reduce the overall length of the powertrain.

Further, since a separation wall is disposed in the housing receiving the driving motor and the first clutch and a cover is disposed between the driving motor and the second clutch, the first clutch, the driving motor, and the second clutch are disposed in the compartment structure, thereby achieving a stable structure.

Further, since the motor shaft of the driving motor passes rough the separation wall and is supported by the first bearing, and since the rotary shaft of the second clutch is partially inserted in the motor shaft and supported by the second bearing, the shafts are stably maintained and the overall length of the powertrain can be effectively reduced.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings.

Figure 1:
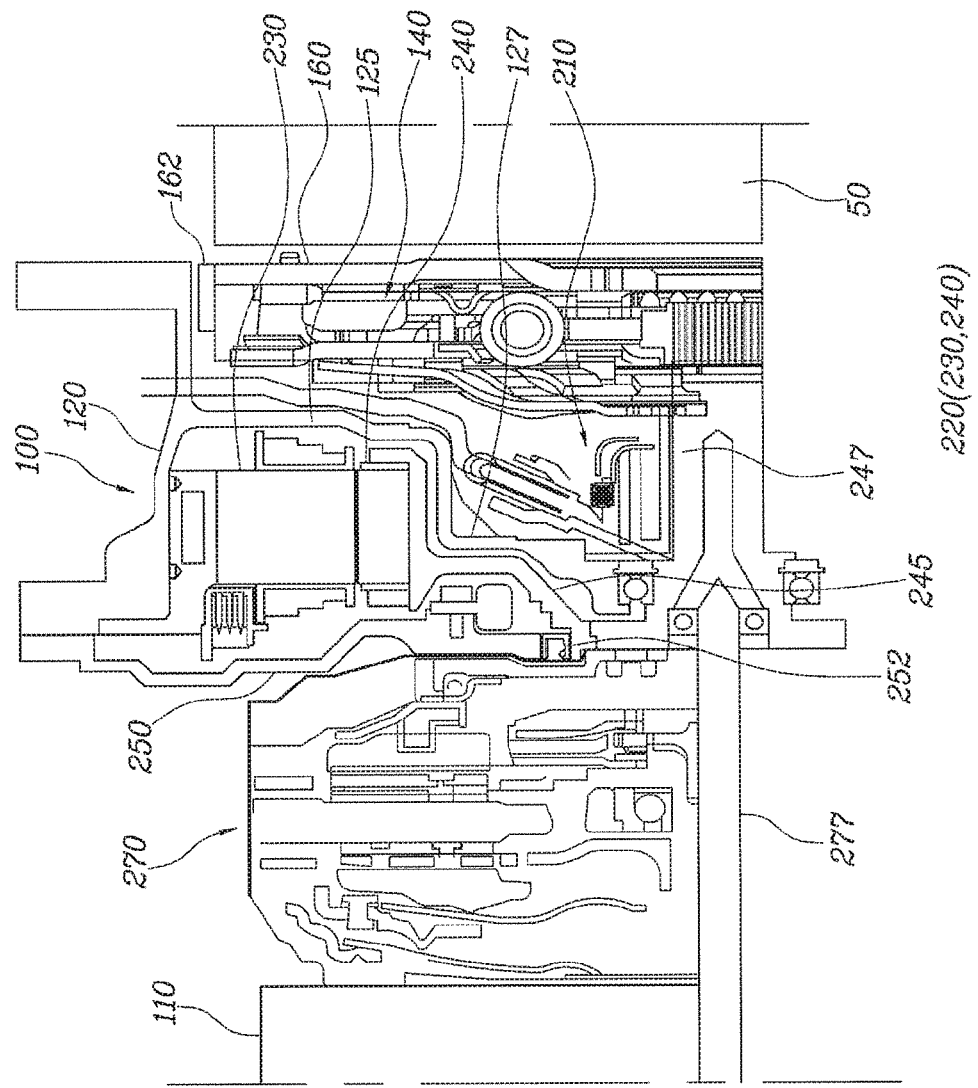
FIG. 1 is a view schematically showing a cross-section of the structure of a powertrain for a vehicle according to an embodiment of the present disclosure.
Figure 2:
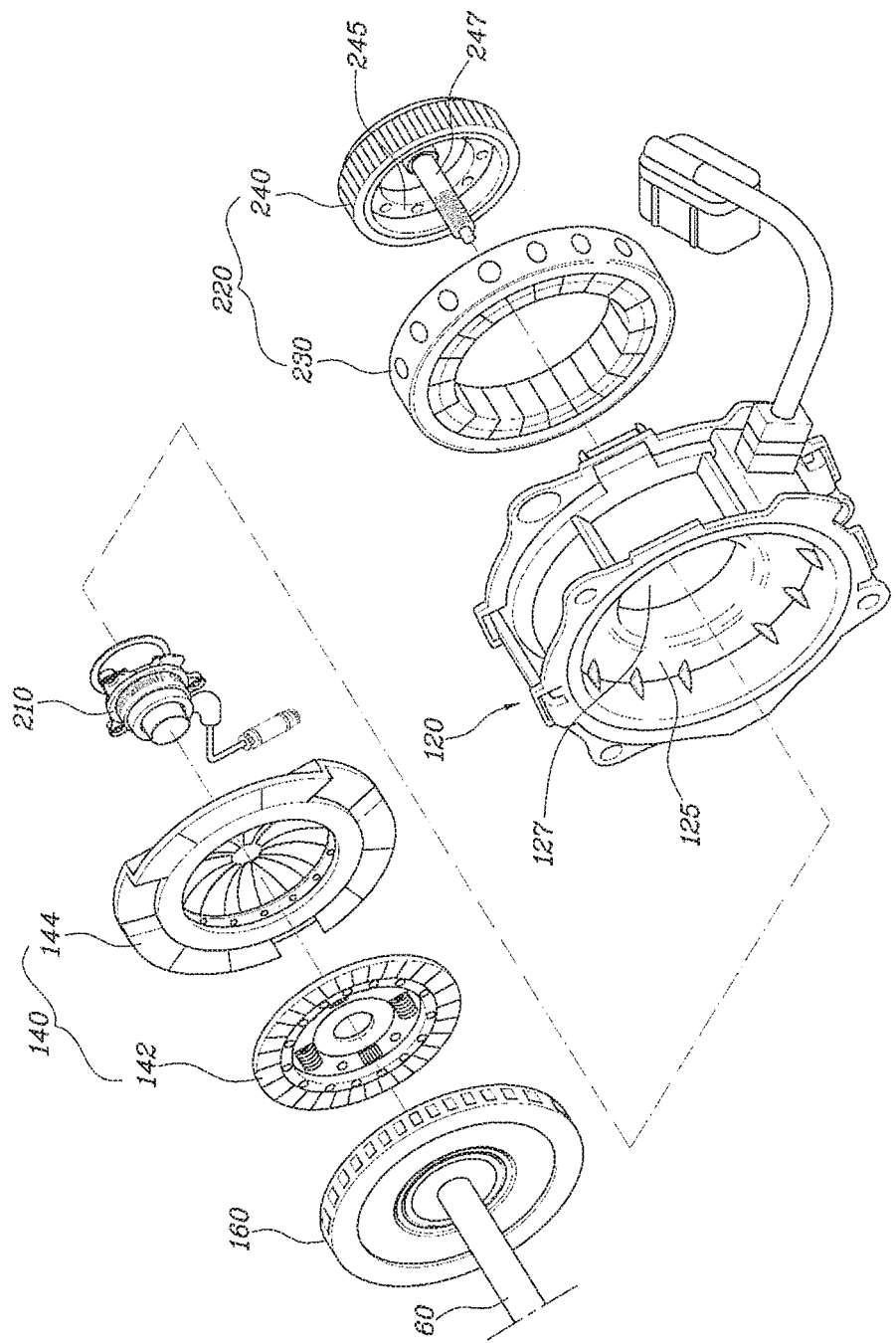
FIG. 2 is an exploded view of the structure of a powertrain for a vehicle according to an embodiment of the present disclosure.

The structure 100 of a powertrain for a vehicle according to the present disclosure, as shown in FIGS. 1 and 2, includes a first clutch 140 for connecting/disconnecting power from an engine 50; a driving motor 220 disposed between the first clutch 140 and a transmission 110, including a stator 230 and a rotor 240, and having a recess 245 formed toward the transmission 110 in the center of the side facing the first clutch 140 in the rotor 240; and an actuator 210 at least partially inserted in the recess 245 to operate the first clutch 140.

In detail, the first clutch 140 connects/disconnects power from the engine 50. Although the present disclosure assumes a vehicle equipped with both the engine 50 and the driving motor 220, the first clutch 140 may be disposed between the engine 50 and the driving motor 220 to connect/disconnect power from the engine 50.

The first clutch 140 requires the actuator 210 to operate and it may be a friction clutch including a friction disc 142 and a leaf spring 144. As will be described below, the friction disc 142 of the first clutch 140 of the present disclosure is selectively engaged with a flywheel 160 on a crankshaft 60 of the engine 50, thereby connecting/disconnecting power from the engine 50.

The first clutch 140 may be a constant mesh type in which the friction disc 142 is in mesh with the flywheel 160 before the actuator 210 is operated or may be a constant non-mesh type in which the friction disc 142 is not in mesh with the flywheel 160 before the actuator 210 is operated.

The first clutch 140 may be a constant mesh type in which the friction disc 142 is engaged with the flywheel 160 by a pressing plate to transmit power, after which they are disengaged when the actuator 210 is operated.

The driving motor 220 is disposed between the first clutch 140 and the transmission 110, includes the stator 230 and the rotor 240, and has the recess 245 formed toward the transmission 110 in the center 127 of the side facing the first clutch 140 in the rotor 240.

In detail, a motor shaft 247 of the driving motor 220 is fitted in the rotor 240 and the friction disc 142 of the first clutch is fitted on the motor shaft 247. That is, power from the engine 50 is transmitted to the motor shaft 247 by the first clutch 140 and the motor shaft 247 receives power from the driving motor 220 by rotation of the rotor 240.

As a result, the power from the engine 50 and the power from the driving motor 220 are combined in the motor shaft 247, and as will be described below, the combined power is transmitted to a second clutch 270 (to the transmission 110).

The side of the rotor 240 of the driving motor 220 that faces the first clutch 140 is concavely formed, thereby forming the recess 245. The shape of the recess 245 is shown in FIGS. 1 and 2. Further, as shown in FIGS. 1 and 2, the motor shaft 247 is fitted through the bottom of the recess 245, whereby its rotation is limited by the rotor 240.

The actuator 210 is at least partially inserted in the recess 245 and operates the first clutch 140. The actuator 210 may be operated in various ways including a hydraulic type or an electric type and is at least partially inserted in the recess 245. The actuator 210 may be fully inserted in the recess 245 before operating.

In the structure 100 of a powertrain for a vehicle, since various parts for transmitting power are disposed, the powertrain is long in comparison to other component. It is advantageous to reduce the overall length of the powertrain in terms of spatial efficiency when designing the interior of a vehicle.

That is, according to the present disclosure, the recess 245 is formed in the rotor 240, and the actuator 210 for operating the first clutch 140 is inserted in the recess 245. Therefore, is possible to minimize an increase in the overall length due to the actuator 210 and it is also possible to effectively prevent an increase in the overall length of the powertrain despite the presence of the driving motor 220.

FIG. 1 shows a cross-compartment of the powertrain that includes the first clutch 140, the actuator 210, and the driving motor 220. FIG. 2 is a perspective view in which the first clutch 140, the actuator 210, and the driving motor 220 are separated.

As shown in FIGS. 1 to 4, the structure 100 of a powertrain for a vehicle according to an embodiment of the present disclosure further includes a housing 120 that contains the driving motor 220 and the first clutch 140 and has an internal compartment structure formed by a separation wall 125 separating the driving motor 220 and the first clutch unit 140.

In detail, the driving motor 220 and the first clutch 140 are disposed in the housing 120 and the separation wall 125 separating the driving motor 220 and the first clutch 140 is formed in the housing 120. Accordingly, the housing has an internal compartment structure composed of a plurality of separate compartments arranged in a series.

Figure 4:
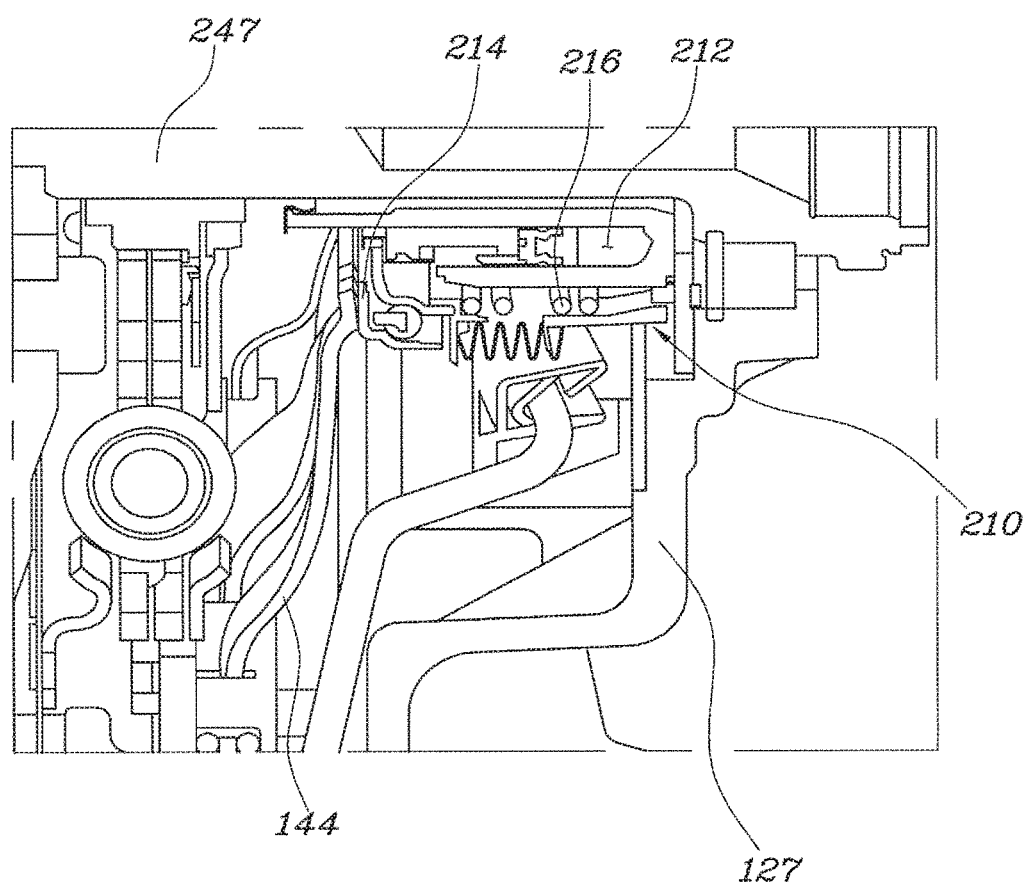
FIG. 4 is a view of the actuator in the structure of a powertrain for a vehicle according to an embodiment of the present disclosure.

FIG. 1 shows the first clutch 140 and the driving motor 220 disposed in compartments inside the housing 120 and FIG. 2 shows a portion of the housing 120 having the separation wall 125. FIG. 4 shows the actuator 210 on the separation wall 125 and FIG. 4 is a cross-compartmental view of the separation wall 125 on which the actuator 210 is mounted.

Since the housing 120 has the internal compartment structure, it is possible to effectively prevent the movement of materials between the first clutch 140 and the driving motor 220 and structural stability is also greatly improved in an embodiment of the present disclosure. Further, it is possible to prevent the amplification of noise due to the resonance of rotational parts.

Figure 3:
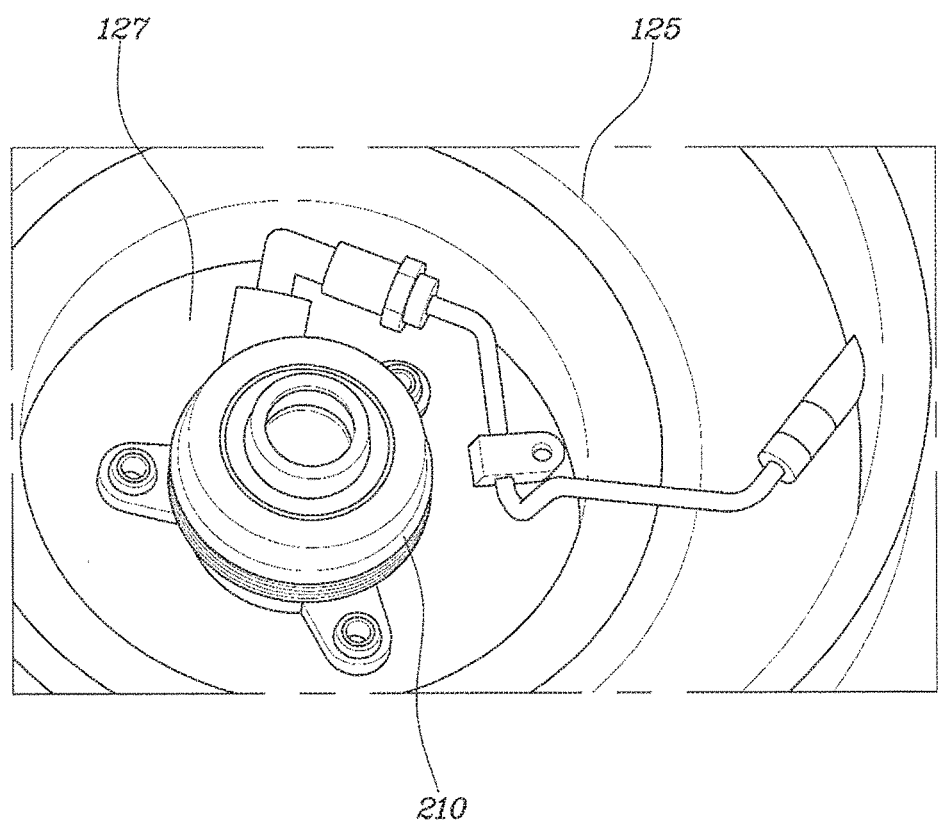
FIG. 3 is a view showing an actuator on a separation wall in the structure of a powertrain for a vehicle according to an embodiment of the present disclosure.

On the other hand, as shown in FIGS. 1, 3, and 4, in the structure 100 of a powertrain for a vehicle according to an embodiment of the present disclosure, the separation wall 125 of the housing 120 is recessed at the center 127 to be inserted in the recess 245 of the rotor 240, and the actuator 210 is disposed in the center 127 of the separation wall 125.

In detail, the separation wall 125 has a side facing the driving motor 220 and the rotor 240 of the driving motor 220 has a recess 245 in the side facing the separation wall 125. The separation wall 125 is positioned with the center 127 inserted in the recess 245, the center 127 having a shape corresponding to the shape of the recess 245.

The actuator 210 is disposed inside the center 127 of the separation wall 125 inserted in the recess 245, so the actuator 210 is also inserted in the recess 245, and accordingly, the length to which the actuator 210 protrudes from the driving motor 220 along the motor shaft 247 of the driving motor 220 is greatly reduced.

Therefore, according to an embodiment of the present disclosure, since the actuator 210 is disposed inside the center 127 of the separation wall 125 fitted in the recess 245, the length that the actuator 210 protrudes from the driving motor 220 can be reduced, and accordingly, the overall length of the powertrain, including the actuator 210 and the driving motor 220, can be greatly decreased.

FIG. 1 shows the separation wall 125 having the recessed center 127, FIG. 3 shows the state in which the actuator 210 is disposed inside the center 127 of the separation wall 125, and FIG. 4 shows a cross section of the actuator 210 on the separation wall 125.

As shown in FIG. 4, in the structure 100 of a powertrain for a vehicle according to an embodiment of the present disclosure, the actuator 210 is a hydraulic type and has a hydraulic chamber 212 in which hydraulic pressure is generated by oil flowing therein. Further, the actuator 210 has a pressing portion 214 that is moved along the motor shaft 247 of the driving motor 220 to press the leaf spring 144 of the first clutch 140 using the hydraulic pressure generated in the hydraulic chamber 212, and a support spring 216 that keeps the pressing portion 214 in contact with the leaf spring 144 by supporting the pressing portion 214.

In detail, the actuator 210 is a hydraulic type in an embodiment of the present disclosure. The actuator 210 may include a valve for controlling the flow of oil and an oil channel for guiding oil to the actuator 210 may be provided.

The oil channel may extend from the housing 120 to the actuator 210 and the hydraulic chamber 212 that is filled with oil to generate pressure is formed in the actuator 210.

FIG. 4 shows the inside of the actuator 210. The actuator 210 may change in direction along the motor shaft 247 of the driving motor 220 due to the hydraulic pressure that is generated in the hydraulic chamber 212.

The pressing portion 214 that is moved by hydraulic pressure to press the leaf spring 144 of the first clutch 140 is formed at the side of the hydraulic chamber 212 that faces the first clutch 140. Further, the support spring 216 that supports the pressing portion 214 is disposed in the actuator 210 to keep the pressing portion 214 in contact with the side of the leaf spring 144 even before hydraulic pressure is generated and the pressing portion 214 presses the leaf spring 144.

The support spring 216 may surround the outer side of the hydraulic chamber 212, but this may be determined in various ways by engineers depending on the requirements of some design.

As a result, in an embodiment of the present disclosure, the pressing portion 214 of the actuator 210 is in contact with the leaf spring 144 by the support spring 216. When hydraulic pressure is generated in the hydraulic chamber 212 to operate the first clutch 140, the pressing portion 214 is moved to press the leaf spring 144 by pressure from the hydraulic chamber 212 and the leaf spring 144 that has pressed the friction disc 142 stops pressing the friction disc 142 due to the pressing portion 214, whereby the friction disc 142 is released.

The structure 100 of a powertrain for a vehicle according to the present disclosure, as shown in FIG. 1, further includes: a second clutch 270 disposed between the transmission 110 and the driving motor 220 to connect/disconnect power transmitted from the driving motor 220 to the transmission 110; and a cover 250 separating the second clutch 270 and the driving motor 220, in which the first clutch 140, the driving motor 220, and the second clutch 270 are separated by the separation wall 125 and the cover 250.

In detail, the first clutch 140 is disposed between the engine 50 and the driving motor 220 and the second clutch 270 is disposed between the driving motor 220 and the transmission 110. The engine 50, the first clutch 140, the driving motor 220, the second clutch 270, and the transmission 110 may be connected in series.

As described above, in an embodiment of the present disclosure, the separation wall 125 separates the driving motor 220 and the first clutch 140. However, in the embodiment, the cover 250 for separating the driving motor 220 and the second clutch 270 is mounted on the housing 120, so that a sequential compartment structure is achieved by the separation wall 125 and the cover 250.

The first clutch 140, the driving motor 220, and the second clutch 270 are separated in respective compartments defined by the separation wall 125 and the cover 250. Accordingly, because the first clutch 140, the driving motor 220, and the second clutch 270 are spatially separated from each other, contaminants cannot move between them, and structural stability is improved.

As a result, in an embodiment of the present disclosure, a compartment structure in which two adjacent compartments share one side is formed by the separation wall 125 and the cover 250, and the first clutch 140, the driving motor 220, and the second clutch 270 are disposed in the respective compartments, so this structure is advantageous in preventing the movement of contaminants between them and improving structural stability. This compartment structure is shown in FIG. 1.

Further, as shown in FIG. 1, in the structure 100 of a powertrain for a vehicle according to an embodiment of the present disclosure, the center of the cover 250 is fitted on the motor shaft 247 of the driving motor 220, and a sealing member 252 is provided to fill the gap between the motor shaft 247 and the cover 250.

In detail, the cover 250 is coupled to cover the side of the driving motor 220 that faces the second clutch 270. The center of the cover 250 is fitted on the motor shaft 247 of the driving motor 220, and the center of the rotor 240 of the driving motor 220 (the center of the recess 245), which is coupled to the motor shaft 247, may also be positioned in a hole in the center of the cover 250 together with the motor shaft 247.

Since the hole is formed in the center of the cover 250, contaminants such as oil can flow in between the second clutch 270 and the driving motor 220, so that the sealing member 252 is provided to prevent this problem in an embodiment of the present disclosure.

The sealing member 252 is disposed in the hole in the center of the cover 250 to fill the gap the cover 250 and the motor shaft 247. When a portion of the center portion of the rotor 240 is positioned in the hole of the cover 250 together with the motor shaft 247, the sealing member 252 may fill the gap between the hole and the center of the rotor 240.

As a result, in an embodiment of the present disclosure, the sealing member 252 for filling the gap is provided to prevent contaminants from moving between the driving motor 220 and the second clutch 270 through the gap formed in the center of the cover 250.

FIG. 1 schematically shows a cross-section of the sealing member 252.

As shown in FIG. 1, the structure 100 of a powertrain for a vehicle according to an embodiment of the present disclosure further includes the second clutch 270 disposed between the transmission 110 and the driving motor 220 to connect/disconnect the power transmitted from the driving motor 220 to the transmission, in which the motor shaft 247 of the driving motor 220 is a hollow shaft and a rotary shaft 277 of the second clutch 270 is at least partially inserted in the motor shaft 247.

In detail, the second clutch 270 connects/disconnects power transmitted from the driving motor 220 to the transmission 110 (the power may include both of the power from the engine 50 and the power from the driving motor 220).

The second clutch 270 may be one of various types of clutches, such as a hydraulic type or a friction-disc type. The second clutch 270, similar to the embodiment of the first clutch 140, may be a friction clutch including a friction disc, or may be a dual clutch including two friction discs.

The motor shaft 247 faces the second clutch 270 through the cover 250 and a hole is formed in the end facing the second clutch 270. Further, the rotary shaft 277 on which a friction disc is fitted in the second clutch is disposed such that at least a portion of the end facing the motor shaft 247 is inserted in the motor shaft 247.

That is, the rotary shaft 277 of the second clutch 270 is inserted and supported in the motor shaft 247. Accordingly, there is no specific section for supporting the rotary shaft 277 of the second clutch 270, so that the overall length of the powertrain for a vehicle according to an embodiment of the present disclosure is reduced.

Referring to FIG. 1, a portion of the rotary shaft 277 of the second clutch 270 is inserted in the hole of the motor shaft 247 of the driving motor 220, whereby a support section is not visible and the overall length is reduced.

As shown in FIG. 1, the structure 100 of a powertrain for a vehicle according to an embodiment of the present disclosure further includes the housing 120 receiving the driving motor 220 and the first clutch 140 and having a compartment structure formed by the separation wall 125 separating the driving motor 220 and the first clutch 140, in which a first bearing supporting the motor shaft 247 is disposed between the separation wall 125 and the motor shaft 247 and a second bearing supporting the rotary shaft 277 is disposed between the motor shaft 247 and the rotary shaft 277 of the second clutch 270.

In detail, the motor shaft 247 that passes through the center 127 of the separation wall 125 in the housing 120 is supported by the first bearing disposed between the separation wall 125 and the motor shaft 247. Accordingly, the motor shaft 247 and the rotor 240 of the driving motor 220 can be stably fixed in place.

Further, the second bearing is disposed between the rotary shaft 277 inserted in the motor shaft 247 of the second clutch 270 and the inner side of the motor shaft 247, thereby stably supporting the rotary shaft 277 of the second clutch 270 that is a rotary body.

As a result, in embodiment of the present disclosure, since the first bearing is disposed between the motor shaft 247 and the separation wall 125 and the second bearing is disposed between the inner side of the motor shaft 247 and the rotary shaft 277 of the second clutch 270, structural stability is improved even without a specific support section for supporting the motor shaft 247 or the rotary shaft 277, so that the overall length of the powertrain can be reduced.

The first bearing supporting the motor shaft 247 and the second bearing supporting the rotary shaft 277 of the second clutch are shown in FIG. 1.

Figure 5:
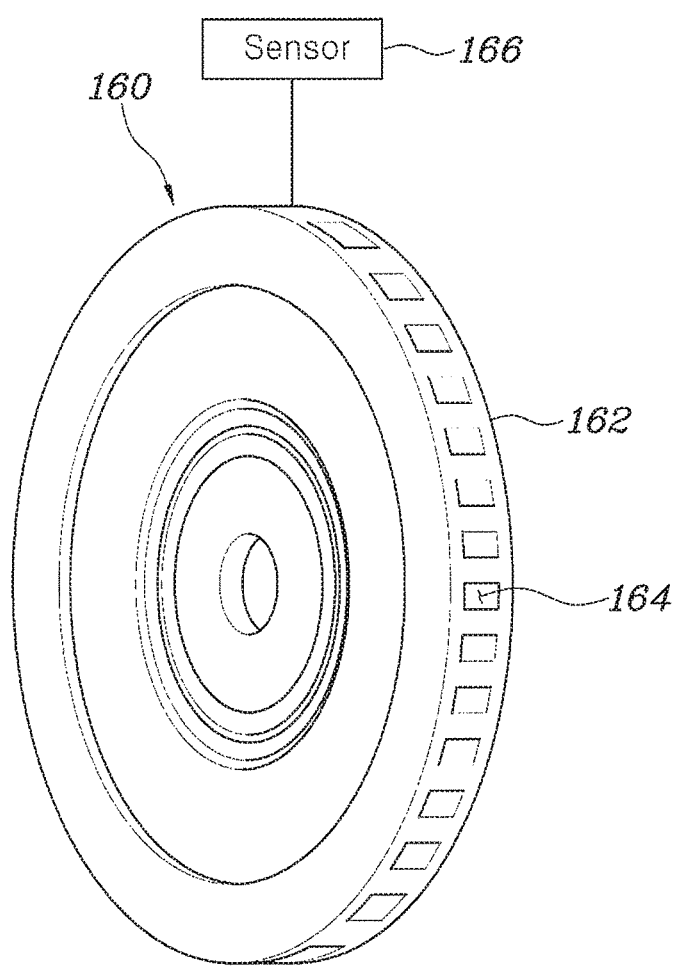
FIG. 5 is a view of a sensor ring on a flywheel in the structure of powertrain for a vehicle according to an embodiment of the present disclosure.

On the other hand, as shown in FIGS. 1, 2, and 5, in the structure 100 of a powertrain for a vehicle according to an embodiment of the present disclosure, a sensor ring 162 is mounted on a flywheel 160 mounted on a crankshaft 60 of the engine 50 and a position sensor 166 is disposed on the flywheel 160 to detect the rotational speed of the sensor ring 162.

In detail, in an embodiment of the present disclosure, the friction disc 142 of the first clutch 140 is engaged with and disengaged from the flywheel 160. The flywheel 160 is mounted on the crankshaft 60 of the engine 50, and the sensor ring 162 and the position sensor 166 are provided in an embodiment of the present disclosure to detect the rotational speed of the flywheel 160.

The flywheel 160 may have teeth around the outer side to be easily rotated by a starter motor when a vehicle is started. Accordingly, holes may be formed at regular intervals in a flat side of the flywheel 160 to detect the rotational speed of the flywheel 160 and the position sensor 166 (for example, a hole sensor) may be disposed on the front side or the rear side of the flywheel 160.

However, in an embodiment of the present disclosure, it is possible to rotate the crankshaft 60 of the engine using the driving motor 220 instead of a starter motor when starting a vehicle. Accordingly, it is possible to reduce the overall length by disposing the sensor ring 162 on the outer side, removing teeth from the outer side of the flywheel 160, and positioning the position sensor 166 in the radial direction of the flywheel 160.

The sensor ring 162 mounted around the outer side of the flywheel 160 is shown in FIG. 1 and the flywheel 160 equipped with the sensor ring 162 is shown in FIG. 2. FIG. 5 schematically shows the flywheel 160 equipped with the sensor ring 162 and the position of the position sensor 166.

As shown in FIG. 5, in the structure 100 of a powertrain for a vehicle according to an embodiment of the present disclosure, the sensor ring 162 protrudes in the longitudinal direction of the crankshaft 60 from the outer side of the flywheel 160 and a plurality of holes is formed at regular intervals.

In detail, as described above, the sensor ring 162 is mounted on the outer side of the flywheel 160 without teeth in an embodiment of the present disclosure. The sensor ring 162 extends in the longitudinal direction of the crankshaft 60 from the outer side of the flywheel 160. In FIG. 5, the sensor ring 162 is separately manufactured and then mounted around the outer side of the flywheel 160. However, the shape or the coupling relationship of the sensor ring 162 may be determined in various ways by common engineers.

Further, the sensor ring 162 has holes formed at regular intervals and the position sensor 166 may measure the rotational speed of the flywheel 160 by measuring the positions of the holes while the flywheel 160 is rotated.

Therefore, the sensor ring 162 is mounted on the cuter side of the flywheel 160 and the position sensor 166 is mounted in the radial direction of the flywheel 160 in an embodiment of the present disclosure, whereby it is possible to reduce the overall length of the powertrain.

Although the present disclosure has been described with reference to specific embodiments shown in the drawings, it will be apparent to those skilled in the art that the present disclosure may be changed and modified in various ways without departing from the scope of the present disclosure, which is described in the following claims.

What is claimed is:

1. A structure of a powertrain for a vehicle, the structure comprising:
   a first clutch connecting or disconnecting power from an engine;
   a driving motor disposed between the first clutch and a transmission, including a stator and a rotor, and having a recess such that a center of a side of the rotor that faces the first clutch concaves toward the transmission;
   an actuator at least partially inserted in the recess to operate the first clutch;
   a housing receiving the driving motor and the first clutch therein and having a separation wall which separates the driving motor from the first clutch in a compartment structure;
   a second clutch disposed between the transmission and the driving motor to connect or disconnect power transmitted from the driving motor to the transmission; and
   a cover separating the second clutch and the driving motor,
   wherein the compartment structure separating the first clutch, the driving motor, and the second clutch is formed by the separation wall and the cover.

2. The structure of claim 1, wherein the separation wall of the housing is recessed at a center to be inserted in the recess of the rotor, and the actuator is disposed at the center of the separation wall.

3. The structure of claim 2, wherein the actuator is a hydraulic actuator, has a hydraulic chamber where a hydraulic pressure is generated by an oil supplied therein, has a pressing portion moved along a motor shaft of the driving motor by the hydraulic pressure generated in the hydraulic chamber to press a leaf spring of the first clutch, and has a support spring supporting the pressing portion to keep the pressing portion in contact with the leaf spring.

4. The structure of claim 1, wherein a center of the cover is fitted on a motor shaft of the driving motor and a sealing member is provided to fill a gap between the motor shaft and the cover.

5. A structure of a powertrain for a vehicle, the structure comprising:
   a first clutch connecting or disconnecting power from an engine;
   a driving motor disposed between the first clutch and a transmission, including a stator and a rotor, and having a recess such that a center of a side of the rotor that faces the first clutch concave toward the transmission;
   an actuator at least partially inserted in the recess to operate the first clutch;
   a housing receiving the driving motor and the first clutch therein and having a separation wall which separates the driving motor and the first clutch in a compartment structure; and
   a second clutch disposed between the transmission and the driving motor to connect or disconnect power transmitted from the driving motor to the transmission,
   wherein a hole is formed in a motor shaft of the driving motor and a rotary shaft of the second clutch is at least partially inserted in the motor shaft.

6. The structure of claim 5,
   wherein a first bearing supporting the motor shaft is disposed between the separation wall and the motor shaft, and
   wherein a second bearing supporting the rotary shaft is disposed between the motor shaft and the rotary shaft of the second clutch.

7. A structure of a power train for a vehicle, the structure comprising:
   a first clutch connecting or disconnecting power from an engine;
   a driving motor disposed between the first clutch and a transmission, including a stator and a rotor, and having a recess such that a center of a side of the rotor that faces the first clutch concave toward the transmission;
   an actuator at least partially inserted in the recess to operate the first clutch; and
   a housing receiving the driving motor and the first clutch therein and having a separation wall which separates the driving motor and the first clutch in a compartment structure,
   wherein a sensor ring is mounted on a flywheel mounted on a crankshaft of the engine, and
   wherein a position sensor is disposed in a radial direction of the flywheel to detect a rotational speed of the sensor ring.

8. The structure of claim 7, wherein the sensor ring protrudes in a longitudinal direction of the crankshaft from an outer side of the flywheel and has a plurality of holes formed at intervals.

* * * * *